(12) United States Patent
Castor (10) Patent No.: US 6,389,334 B1
(45) Date of Patent: May 14, 2002

(54) PROCESS AND DEVICE FOR AUTOMATICALLY SUPPORTED GUIDANCE OF AIRCRAFT TO A PARKING POSITION AND MANAGEMENT SYSTEM THEREFOR

(75) Inventor: Robert Castor, Unterschleissheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/538,278

(22) Filed: Mar. 30, 2000

Related U.S. Application Data

(63) Continuation of application No. PCT/DE98/02799, filed on Sep. 21, 1998.

(30) Foreign Application Priority Data

Sep. 30, 1997 (DE) .......................................... 197 43 213

(51) Int. Cl.$^7$ ................................................. G05D 3/00
(52) U.S. Cl. ........................... 701/3; 701/120; 701/121; 244/75 R; 244/76 R; 340/958; 180/167; 180/168
(58) Field of Search ................................. 701/3, 10, 11, 701/117, 120, 121, 122; 244/76 R, 114 R, 75 R; 340/958, 939, 945, 948, 949, 962, 947; 180/168, 167

(56) References Cited

U.S. PATENT DOCUMENTS

| | | | | |
|---|---|---|---|---|
| 3,662,332 A | | 5/1972 | Zechnowitz, et al. ......... | 340/51 |
| 4,249,159 A | * | 2/1981 | Stasko ........................... | 701/3 |
| 4,733,833 A | * | 3/1988 | Shepherd ................. | 244/114 R |
| 6,023,665 A | * | 2/2000 | Millgard ...................... | 702/151 |

FOREIGN PATENT DOCUMENTS

| | | |
|---|---|---|
| DE | 27 43 281 B2 | 3/1978 |
| DE | 40 09 668 | 10/1991 |
| DE | 196 02 607 | 8/1997 |
| EP | 0 459 295 | 12/1991 |
| WO | WO 96/09207 | 3/1996 |
| WO | WO 97/32291 | 9/1997 |

OTHER PUBLICATIONS

TV–Reference System, AEG Telefunken, Apr. 1982, pp. 1–7.

* cited by examiner

Primary Examiner—William A. Cuchlinski, Jr.
Assistant Examiner—Yonel Beaulieu
(74) Attorney, Agent, or Firm—Sughrue Mion, PLLC (57) ABSTRACT

A method and associated device and management system for automatically guiding an aircraft to a parking position in a parking zone. The aircraft is detected by at least one video camera located in the parking zone which outputs video signals. The video signals are then supplied from the video camera to an evaluation unit, in which the current position of the aircraft is determined from the video signals. In addition, correction instructions for direction and speed of the aircraft are determined from the video signals in the evaluation unit. The correction instructions are transmitted to a control of the aircraft. Furthermore, in the evaluation unit, the video signals are processed into video sequences and non-aircraft objects are identified from the video signals. Finally, the correction instructions and the video sequences are displayed on a control monitor together with additional monitoring data.

21 Claims, 8 Drawing Sheets

PROCESS AND DEVICE FOR AUTOMATICALLY SUPPORTED GUIDANCE OF AIRCRAFT TO A PARKING POSITION AND MANAGEMENT SYSTEM THEREFOR

This is a Continuation of International Application PCT/DE98/02799, with an international filing date of Sep. 21, 1998, the disclosure of which is incorporated into this application by reference.

FIELD OF AND BACKGROUND OF THE INVENTION

The present invention relates to a process for automatically supported guidance of aircraft to a parking position. The process automatically transmits correction instructions for direction and speed to a control of an aircraft. An aircraft located in a parking zone within a detection area of at least one video camera is detected by the video camera. Signals supplied by the video camera are processed in an evaluation unit. The evaluation unit determines the current position of the aircraft and the correction instructions to reach a predefined position. The invention furthermore relates to a device for implementing the process and a management system that permits planning, monitoring, and central control of the gate assignment at airports.

German Patent DE 40 09 668 A1, for example, discloses a process and a device for the positionally precise parking of airplanes. The current position of an airplane is continuously determined by evaluating at least one one-dimensional signal field produced by the airplane and measured through the air by a detector. After evaluation of the signals, instructions are issued to correct the position of an aircraft. A video camera is proposed as the sensor, the signals of which are compared with reference fields to determine the position corrections. Signal display panels that can be optically recognized by the aircraft pilot serve as an output. This prior art process already eliminates the use of pressure detectors, induction loops, and the like.

A further process and a device for the positionally precise guidance of an aircraft to a parking position is disclosed in European Patent Application EP 0 459 295. CCD video cameras arranged in the parking area are used to record the anti-collision light of an aircraft to be guided. A processing unit calculates the center of the anti-collision light from the video signal obtained. The information thus obtained is supplied to an additional processing unit, which determines the position of the anti-collision light relative to the parking position. Thereupon correction instructions are produced, which are indicated to the aircraft pilots by means of a signal display panel.

At modern airports, aircraft that have landed are to be guided to an exact stop position as quickly as possible and in a, for the most part, automatic fashion. Typically, the stop position is determined with reference to an airport terminal, known as a gate.

The prior art process and the prior art device, using a video camera and a signal display panel, basically solve this problem by means of a system closed per se, wherein the signal field provided by the video camera is compared with reference signal fields, and the corrections are determined and displayed. The prior art system has disadvantages with respect to safety since checking and monitoring are complex. In accordance with current practice, the control personnel have assignment and planning data as well as basic parameters available on control monitors. The prior art positioning process using the described device is executed independently thereof. Any required checking is, at the most, possible via additional technical units, and any intervention can, at the most, be carried out via conventional communications paths. Beyond that, central management of a plurality of assignment events integrating the prior art positioning process is not possible since no information coupling is provided.

OBJECTS OF THE INVENTION

Against this background, one object of the present invention is to provide a process, a device, and a management system for automatically supported guidance of aircraft to a parking position that permit a required increase in safety as well as organized and largely centralized monitoring and control.

SUMMARY OF THE INVENTION

According to one formulation, the invention is directed to a method for automatically guiding an aircraft to a parking position in a parking zone. As a first step, the aircraft is detected by at least one video camera located in the parking zone which outputs video signals. The video signals are then supplied from the video camera to an evaluation unit, in which the current position of the aircraft is determined from the video signals. In addition, correction instructions for direction and speed of the aircraft are determined from the video signals in the evaluation unit. The correction instructions are transmitted to a control of the aircraft. Furthermore, in the evaluation unit, the video signals are processed into video sequences and non-aircraft objects are identified from the video signals. Finally, the correction instructions and the video sequences are displayed on a control monitor together with additional monitoring data.

To attain the above and other objects on the process side, the invention proposes a process of the initially described type, wherein the signals supplied by the video camera are further processed into video sequences in the evaluation unit. In addition, non-aircraft objects detected are identified from the signals transmitted by the video camera. The correction instructions for transmission to the aircraft control as well as the video sequences for the integrated display are made available on a control monitor together with additional monitoring data.

Thus, on the process side, the possibility of recalling video sequences to visually monitor a parking event from a control station is integrated into the sequence of determining and transmitting correction instructions. This process according to the invention thus permits control personnel from a central control station at which the typical assignment and planning data, monitoring parameters, etc. are displayed, to inspect video sequences on the same control monitor in order to be able to verify the correct and orderly sequence of a planned parking event. Typically, the control personnel belongs to a ground control or ground service group and is entrusted with the organization and assignment management of the air terminals. Furthermore, video detection includes total object detection in the parking zone area. All static or dynamic objects in the parking zone area are detected and identified. The system is thus able to identify service vehicles, equipment, etc., by means of predefined and stored reference signals and to take them into account in the guidance of the aircraft.

This process according to the invention, on the one hand, substantially increases safety and thus meets the current requirement for processing reliability due to increased air traffic. On the other hand, this process permits completely centralized management.

The video monitoring includes the processing area to detect the current position of the aircraft with the aid of at least one video camera starting from a certain position in which the aircraft reaches the parking zone. The parking zone is detected by the video camera. The current aircraft position is processed with respect to position and alignment and compared with setpoint values in order to calculate instructions with respect to changes in direction and speed. These instructions are made available for display. The invention proposes that, in addition to the positional data, the aircraft type be also automatically determined. The aircraft type affects the calculation of correction values since different aircraft types behave differently with respect to speed and directional changes. Accordingly, the correction values can be influenced by different type references.

The invention furthermore proposes the evaluation of the signals of two video cameras that are arranged in parallel with respect to the optical detection area. On the one hand, redundancy of the sensor mechanisms substantially increases safety. On the other hand, redundancy of the sensor mechanism permits possibilities like functional self-checking by the system, selection of the suitably positioned sensor as a function of the size of the aircraft, etc. At least two video cameras are preferably arranged at a predefined distance one above the other. The cameras are preferably mounted on the outside of the air terminal. They are, in a preferred embodiment, mounted in the vicinity of an imaginary straight line through the aircraft's stopping point and its route of travel shortly before the stopping position.

Advantageously, the video sequences are made available as digital sequences. This makes it possible to position the video sequences on the control monitor with respect to position, size, and zoom factor. This modular approach allows control personnel to arrange the monitoring data, video sequences, planning data, etc. with respect to position and size on the control monitor depending on their current importance. Moreover, the display of the video sequences can be checked with respect to time. Both fast and slow motion is possible, which significantly increases the viewing and evaluation options.

Advantageously, it is furthermore proposed to make the video sequences of different terminals available for call-up as required. The controller can thus switch between different terminals or simultaneously position several video sequences on his monitor.

Advantageously, it is furthermore proposed that the video sequences be stored. This particular process side option represents a significant safety factor, since the stored video sequences can be used to sensitize the detection system, improve the correction calculations, and subsequently review parking events that may have been incorrectly executed.

Advantageously, the data of video cameras of different parking zones are processed in one evaluation unit. This multi-zone capability improves coordination and controllability and increases the economic efficiency of the system.

According to the process, correction values are optically transmitted to the aircraft pilot. Particularly suitable are signal display panels capable of displaying readily recognizable signals for direction, left/right, speed of forward travel, and stop.

Particularly advantageously, it is proposed that environmental parameters, such as light, temperature, visibility conditions, etc. be detected and taken into account when determining the correction values and/or enhancing the video sequences in terms of filtering to increase visibility.

The invention provides a process that permits largely automatic guidance of precise positioning of an aircraft in the last phase of a parking event. In addition, the invention permits central monitoring, control, and central management. This process can be executed by simple and economical means. For signal transmission, conventional line transmission techniques, including glass fiber optics, as well as conventional radio transmission, including the use of mobile radio communications systems, are available.

To attain the above object of the invention on the device side, a device for automatically supported guidance of aircraft to a parking position is proposed in accordance with the aforementioned process. The device includes at least one video camera mounted in a parking zone area and an evaluation unit connected therewith to provide video sequences and to evaluate the video signals. By evaluating the video signals, correction values for guiding the aircraft are determined. The device also includes a signal transmission unit to transmit the correction values to the aircraft, and a video sequence transmission unit to make the video sequences available for call-up by control personnel.

The device according to the invention on the air terminal side includes at least one video camera as the sensor and at least one transmission unit for the correction values. According to one proposal of the invention, an optical signal display panel may be used as the transmission unit. Alternative signal transmission options may also be used.

Advantageously, it is proposed to arrange two video cameras within the parking zone area with substantially identical detection areas. The two cameras can be positioned, for example, vertically one above the other at a predefined distance from each other, and they can be aligned in parallel. Depending on the size of the aircraft, the upper camera may be used for larger aircraft, and the lower camera can be used for smaller aircraft. The cameras may also be simultaneously used for system checking and/or for redundancy to increase system security.

The evaluation unit, advantageously, is a computer comprising, for example, a multiplexer for the video cameras, a frame grabber for image sequence recording, a processor for data evaluation, particularly edge extraction and setpoint determination, a memory, and the required output interfaces.

According to one proposal of the invention, several evaluation units can be linked to a central unit to permit central use of common units, e.g., common memories, processors for special calculations, etc.

According to a particularly advantageous proposal of the invention, the device includes a control unit, for example a computer, comprising at least one control monitor used for the integrated display of monitoring and planning data as well as video sequences.

According to a further advantageous proposal of the invention, the control unit is linked to an airport management system permitting the exchange of assignment data, planning data, budgeting data, etc. The management system can thus provide, for example, aircraft related information, such as airline, flight number, aircraft type, etc., and make it available through the control unit or directly to the evaluation unit. The latter can then take this data into account when determining the correction values without having to identify the aircraft. This will at least substantially increase the speed of aircraft identification as well as ensure an increase in safety.

According to a further advantageous proposal, the device includes a storage unit for archived storage of video sequences. These video sequences are then available for subsequent analysis for various purposes.

Finally, the invention proposes to arrange an operator panel in the area of the signal transmission unit for an on-site operator. An operator located in the area of the air terminal can thus directly issue signals via the signal transmission unit to the pilot, e.g., if the system fails or if other safety considerations make this necessary.

The invention provides a modular and clearly organized device for automatically supported guidance of aircraft to their parking position permitting, with a high degree of operational safety, the integration of video monitoring into the data overview for control personnel.

To improve management and organization of the parking areas at airports, the invention furthermore proposes a management system for operating the automatically supported guidance of aircraft to a parking position in accordance with the processes and devices described above. The management system includes, in addition, a central control unit with a monitor. The monitor is structured for the integrated display of monitoring data and video sequences supplied by the evaluation unit. The evaluation unit evaluates the video signals provided by at least one video camera in the parking zone area. The management system also includes input and output units, and a computer.

The management system according to the invention permits integrated monitoring and control of the parking sequence from central workstations. This provides a number of safety-related and economic advantages. From central control units, correspondingly trained personnel are able to plan and monitor terminal assignment, which is possibly integrated into the management system of the entire ground control. Simultaneously, the personnel can recall video sequences for visual monitoring of automatically guided parking events. They can also possibly directly influence the signal transmission units if this is necessary for safety related or other reasons.

According to an advantageous proposal of the invention, the management system includes an option to select a parking zone in order to view the corresponding video sequences. According to a further proposal of the invention, the positions and sizes of the data displays and the displays of the video sequences can be varied. This option allows the controller to call up, as required, only data, only video sequences, several data/video sequence groups, etc. on his control monitor.

According to an advantageous proposal of the invention, the management system includes the option to store and call up transmitted video sequences for different purposes.

Finally, the management system permits the transmission of correction instructions to override and/or supplement the automatically determined correction instructions.

The management system, according to the invention, makes it possible to integrate into an airport's monitoring and planning system the processes and devices for automatically supported guidance of aircraft to their parking position by simple and effective means.

BRIEF DESCRIPTION OF THE DRAWINGS

Additional advantages and features of the invention are explained in more detail in the description provided below with the aid of the drawings, in which.

DETAILED DESCRIPTION OF THE PREFERRED EMBODIMENTS

Figure 1:
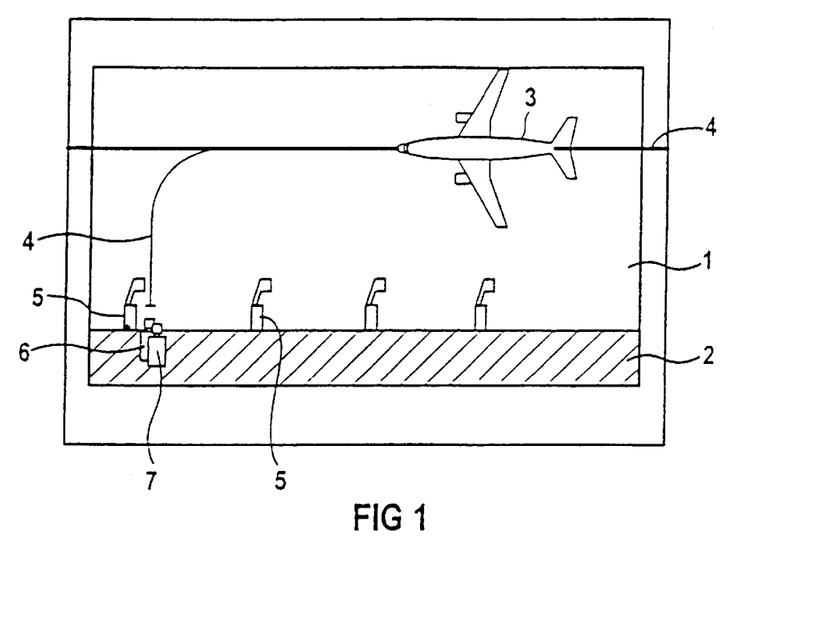
FIG. 1 is a schematic representation of the operational situation on the apron.

FIG. 1 is a rough overview of an apron situation at an airport. In apron area 1 in front of a terminal building 2, an aircraft 3 is located on a taxiway, which is typically marked by lines on the ground. Taxiway 4 is supplemented by the lines leading to individual gates 5.

In the area of each gate, two video cameras 6, 7 are essentially arranged one above the other and parallel to each other. In the present case, it is assumed that gate planning has assigned incoming aircraft 3 to the gate that is shown in FIG. 1 on the far left. Approximately when aircraft 3, after turning off from the straight taxiway, has reached the straight line leading to gate 5, automatic detection, evaluation, and guidance of the aircraft start.

Figure 2:
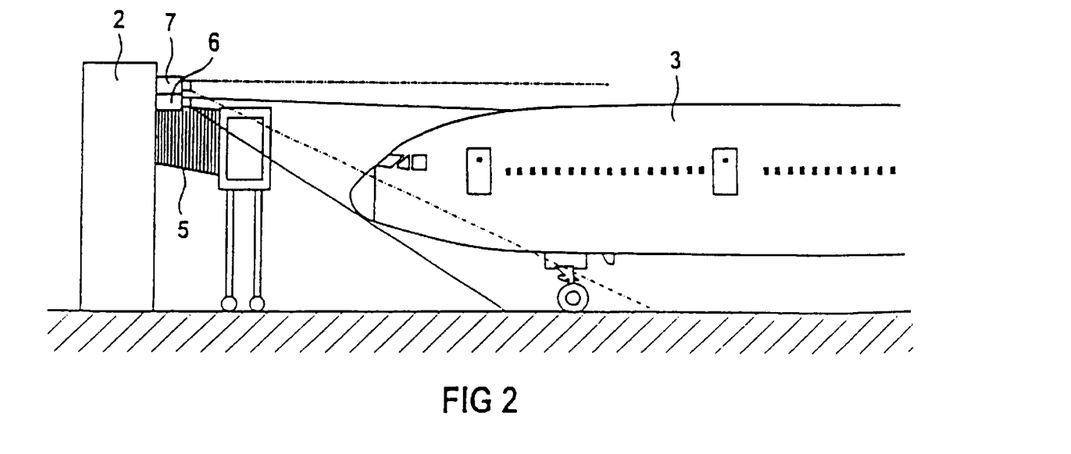
FIG. 2 is a representation of an exemplary embodiment of a parking event.

This situation is roughly shown in a side view in FIG. 2. In this exemplary embodiment, the lower camera No. 6 of the two cameras is used. The two cameras can be used completely redundantly, simultaneously, or as a function, for example, of the aircraft's size.

Figure 3:
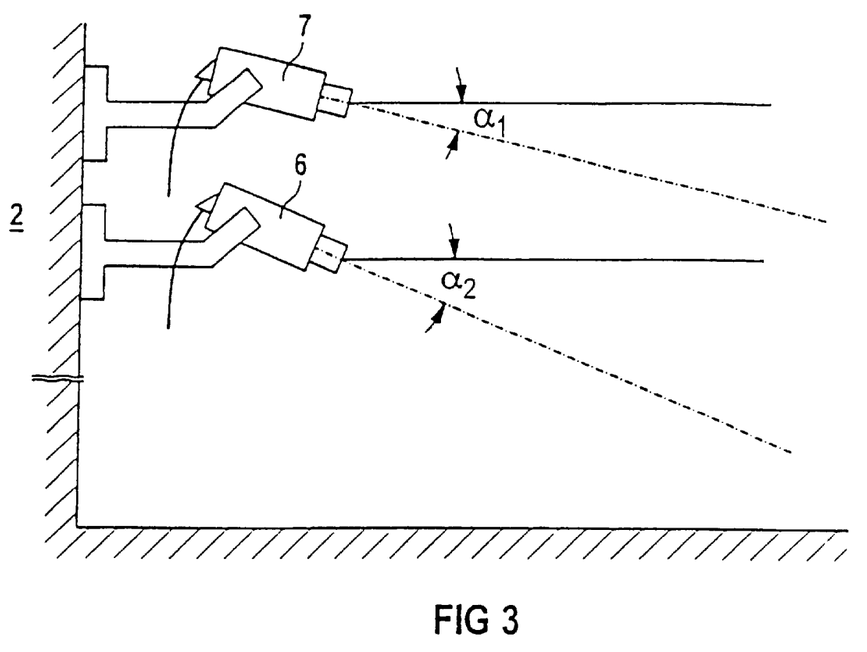
FIG. 3 is a representation of the arrangement of the video cameras.

FIG. 3 schematically shows the arrangement of cameras 6 and 7. These cameras are arranged substantially one above the other and substantially parallel to each other, but the detection angles α1 and α2 are different. In the embodiment shown, the detection angle a1 of the upper camera 7 is smaller than the detection angle α2 of the lower camera. A mounting height of approximately 12 m has proven to be suitable for the lower camera.

Figure 4:
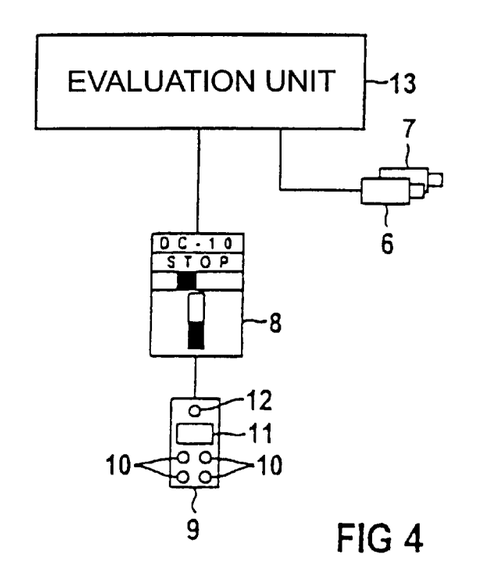
FIG. 4 is a representation of the units of an arrangement according to an exemplary embodiment of the invention.
Figure 5:
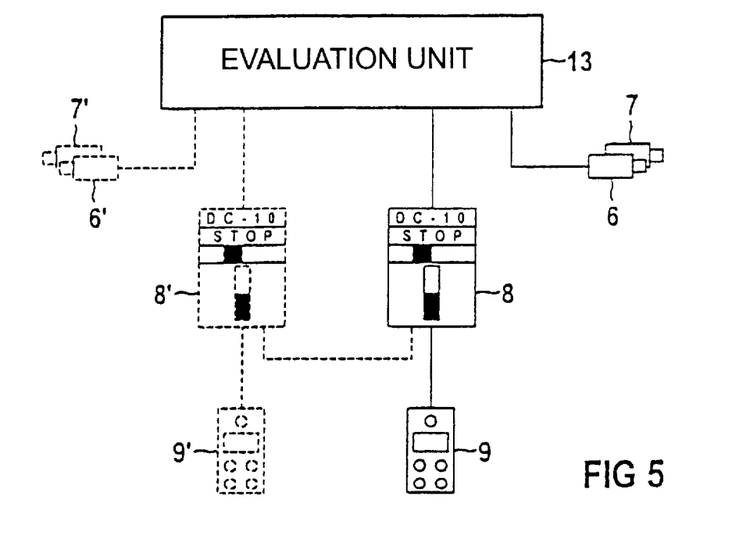
FIG. 5 is an alternative arrangement with two parking areas in accordance with FIG. 4.

FIGS. 4 and 5 schematically show an embodiment for a device according to the invention. Cameras 6 and 7 are connected to an evaluation unit 13. This unit determines the aircraft type as well as the current aircraft position from the video signals. From the current position and the comparison with the parking setpoint, correction instructions with respect to direction and speed are produced. This information is displayed to the pilots on a display panel 8, which is also arranged on the apron so as to be readily visible for the pilots. The pilots can then park the airplane exactly by following the signals. Assuming that the pilots follow the instructions precisely, parking will be within a radius of approximately 25 cm around the target parking position.

FIG. 4 furthermore shows an operator panel 9 with a control panel 10, a display 11, and an emergency button 12. Such an operator panel is provided for safety reasons. In an emergency, an operator located on the apron can operate such a panel so that the airplane either stops immediately or is guided to the parking position. All exterior housings, e.g., camera housing, display panel housing, and control panel housing, are waterproof.

FIG. 5 shows a corresponding arrangement with cameras 6', 7' belonging to an additional gate, the additional display panel 8', and an additional operator panel 9' being indicated by dashed lines. These units, however, are connected with the same evaluation unit 13. Such an arrangement is meaningful, for example, in the case of gates where centerlines are arranged on either side of a mobile gate.

Figure 6:
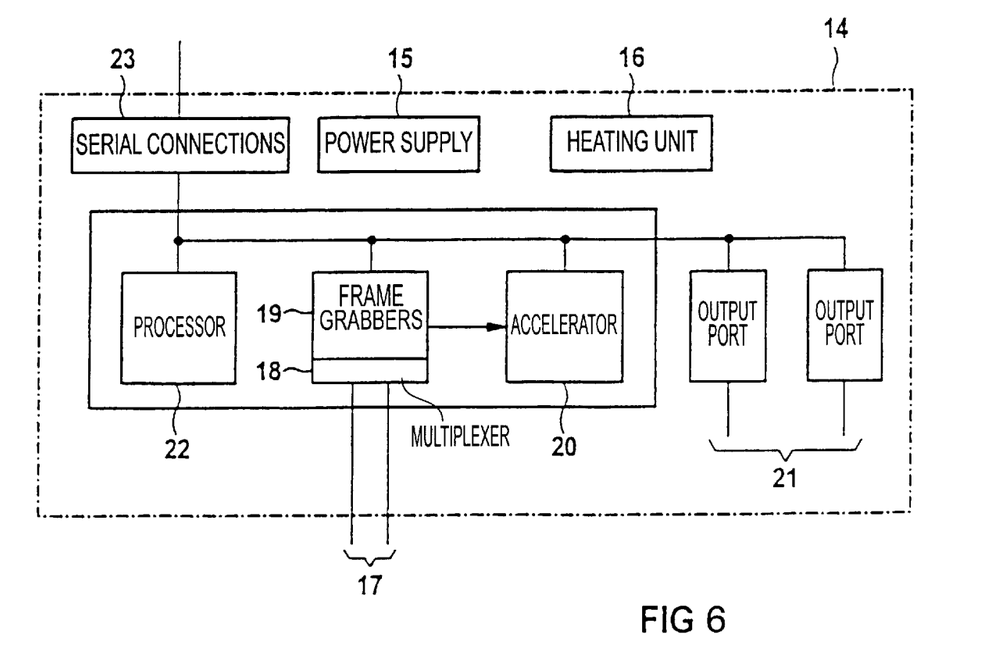
FIG. 6 is an exemplary representation of the elements of an evaluation unit.

FIG. 6 roughly and schematically shows the design of an evaluation unit 13. This unit has camera connections 17, a multiplexer 18 and a frame grabber 19, an accelerator 20, and preferably serial output ports 21 for the display panel. All units are arranged in a waterproof housing 14, in addition to a power supply 15 and a thermostat controlled heating unit 16. Video signal evaluation and display signal calculation is carried out by a processor 22. Preferably, serial connections 23 serve to output operating parameters, calculated parameters, and video sequences.

Figure 7:
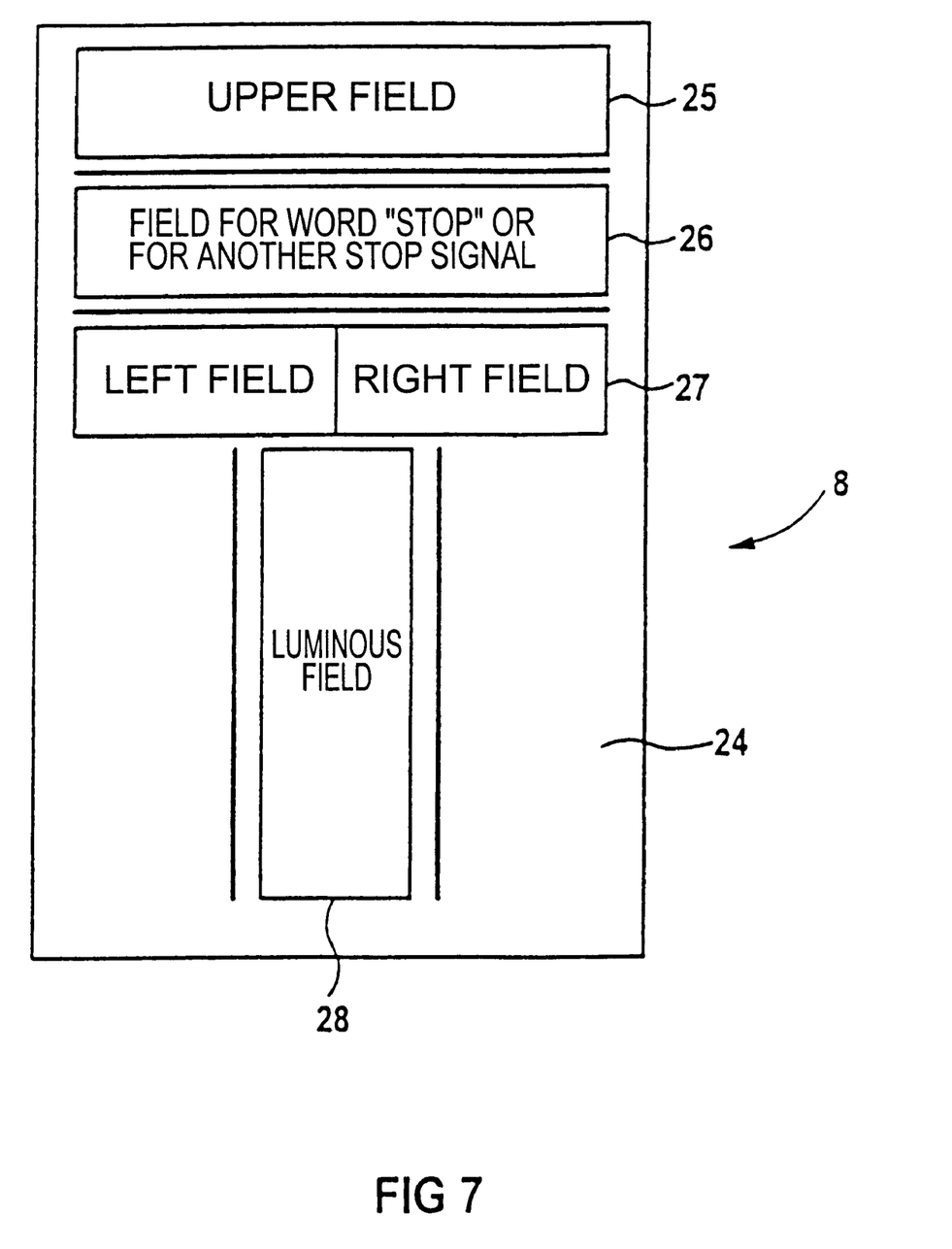
FIG. 7 is a representation of an embodiment for a display panel.

FIG. 7 shows an embodiment of a display panel. In an upper field 25, the aircraft type is displayed, preferably in a color other than red. This display is for safety purposes. The aircraft pilots can verify that the calculated and displayed information in fact relates to the aircraft operated by them. For example, five yellow alphabetical character fields can be used for the display. Yellow has been shown to be readily visible.

In field 26, the word stop or another stop signal is displayed, preferably in red. This display serves to conclude the parking event or, in terms of a safety measure, to abort the event immediately.

Below that, in field 27, a left and right field are arranged. Both are divided, for example, into sixteen individual sequential fields. They serve to indicate the deviation from the centerline. A corresponding display can show the pilot, for example, that he must turn slightly or sharply to the left or to the right.

Luminous field 28 arranged vertically below has, for example, thirty-two yellow individual displays that serve the pilot as a forward signal, i.e., forward travel at low speed or at a higher speed. The signal display panel has a housing 24 that is preferably waterproof.

Figure 8:
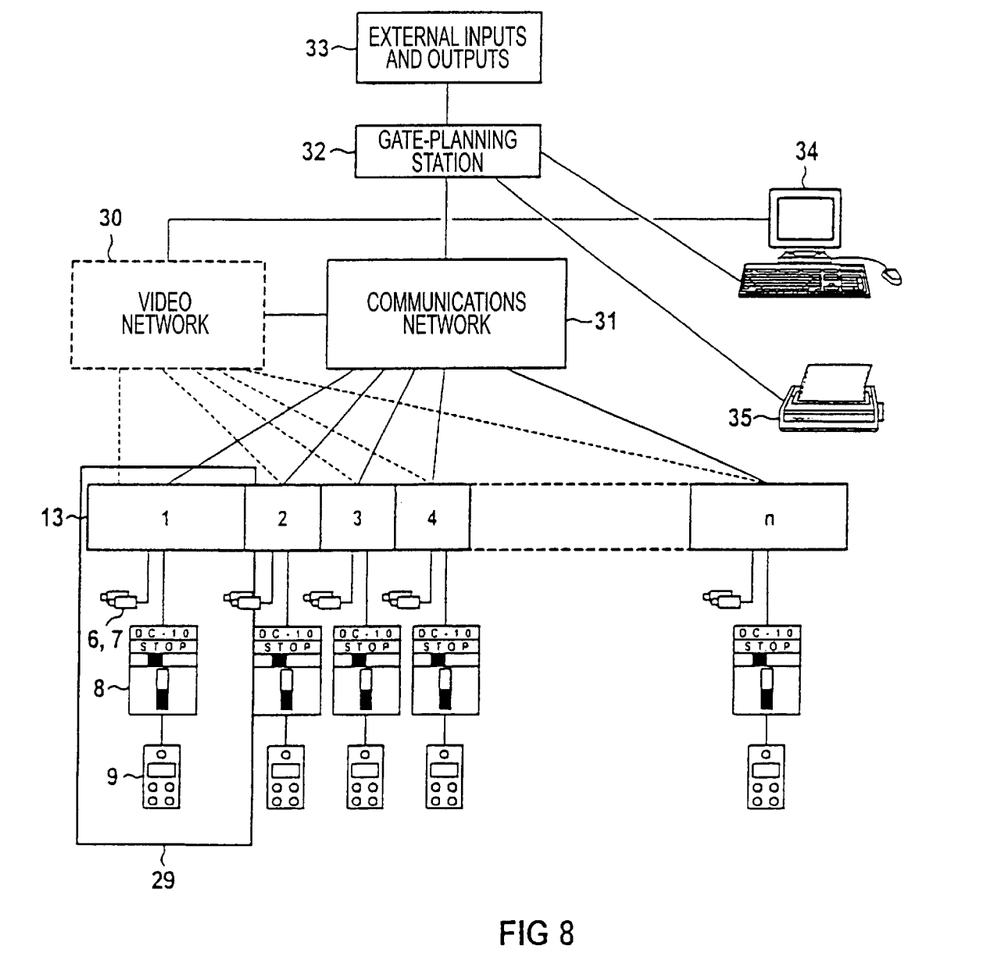
FIG. 8 is a schematic representation of an organizational gate-planning schematic using the invention.

FIG. 8 schematically shows the layout of a corresponding system at an airport. Reference numeral 29 identifies the system of a station or a gate. This system includes the two cameras 6 and 7, the display panel 8, the operator panel 9, and an evaluation unit 13. A plurality of such systems 1 to n is arranged at the different gates 1 to n. All of these systems are connected with a communications network 31 for data exchange, preferably via serial links, and with a video network 30 for video sequence exchange. The video network can also be organized via optical links such that digitization for video sequence display is only subsequently carried out, e.g., at the workstation computer of the controller. The controller sits at a gate-planning station 32. External inputs and outputs 33 are connected in addition to a computer workstation 34 and a printer 35. The controller at computer workstation 34 can display both data and video sequences. Preferably, Windows technology is used for this purpose so that position, size, etc. of the individual displays can be defined.

Figure 9:
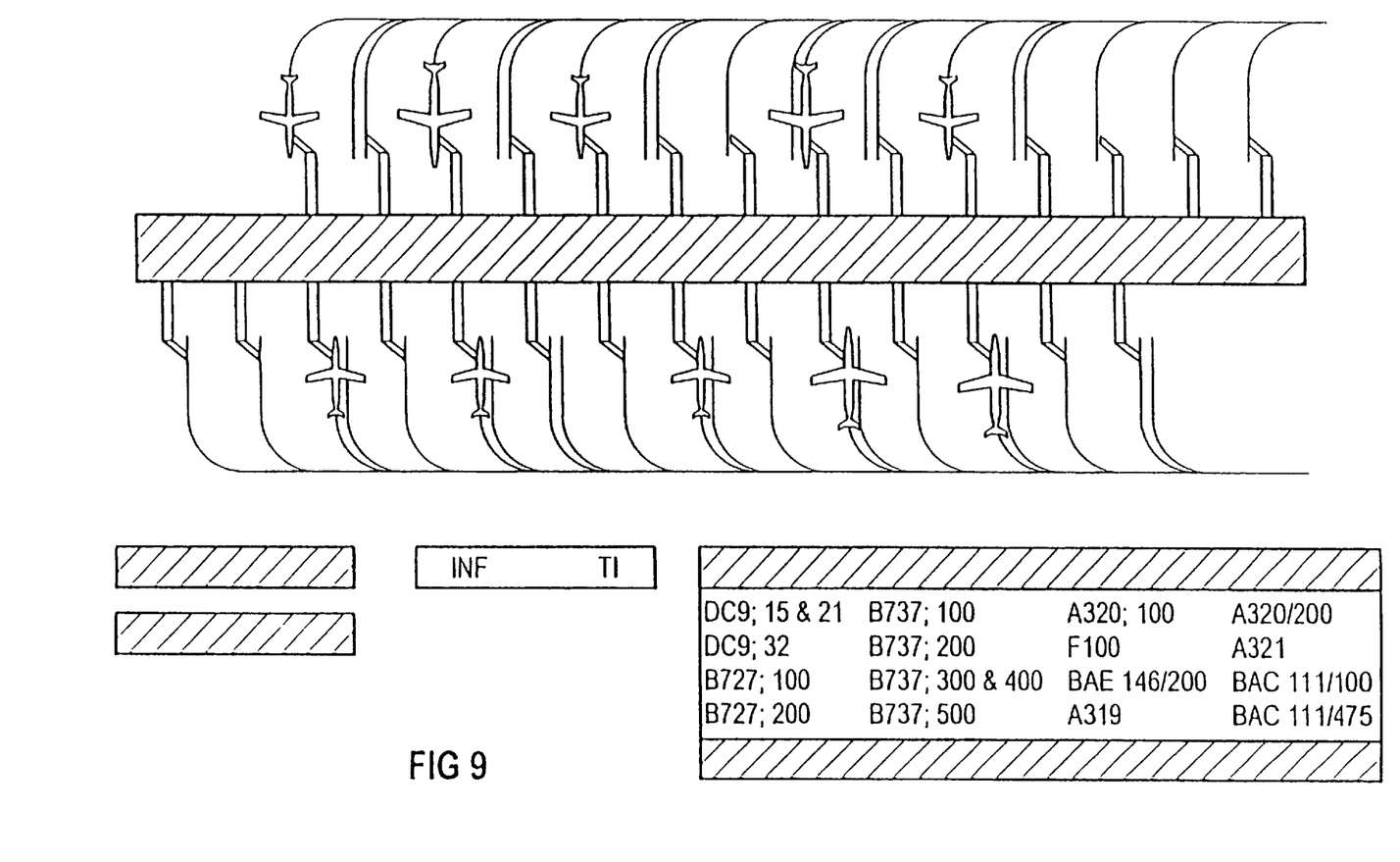
FIG. 9 is a schematic representation of an embodiment of a monitor display.

FIG. 9 shows as an example of a so-called graphic information display that the controller can bring up on his monitor. This shows all available gates with their assignment data. In addition, planning data are also shown in the lower data fields.

Figure 10:
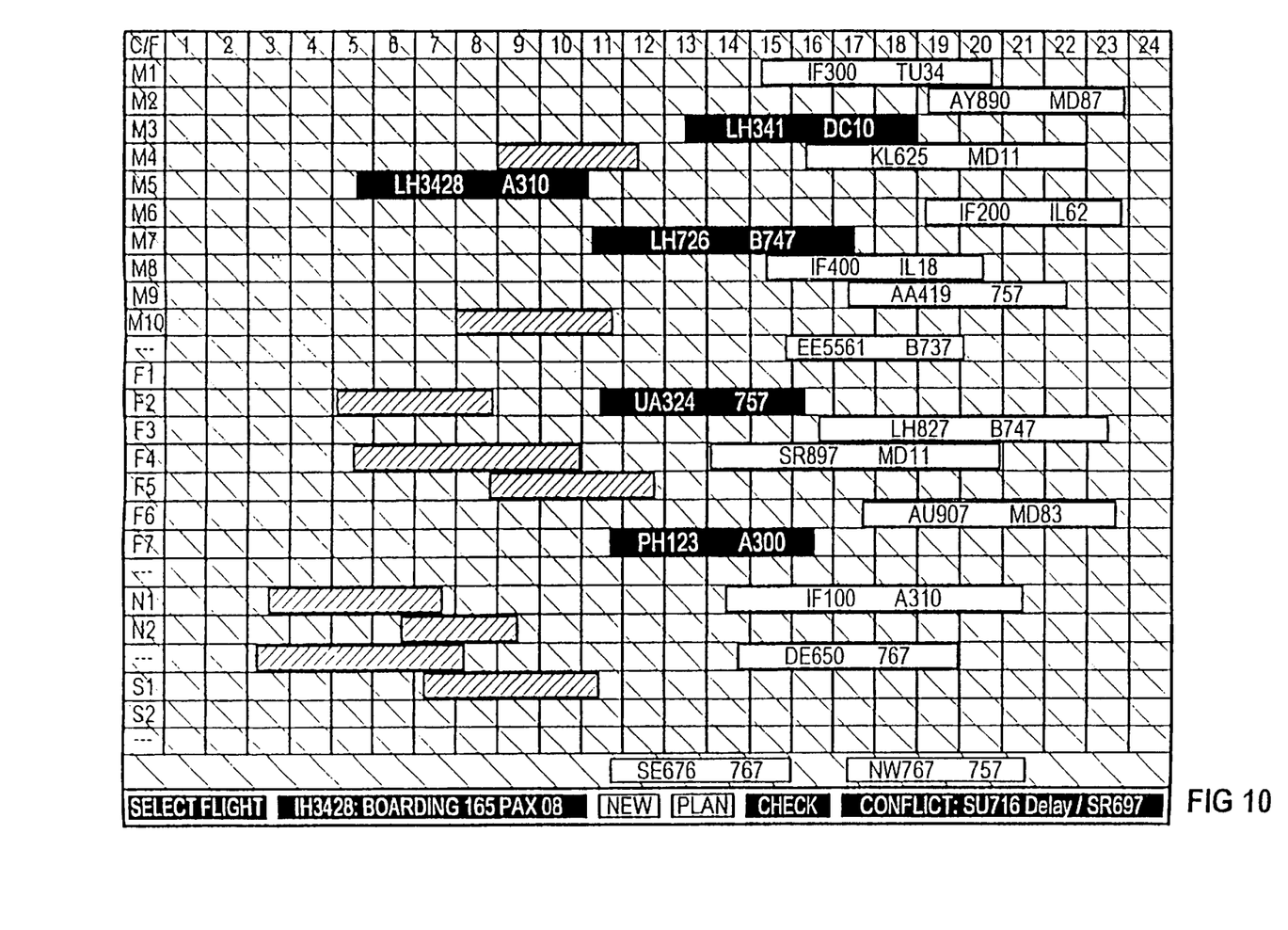
FIG. 10 is a schematic representation of an embodiment of a monitor display.

FIG. 10 shows an alternative display in the form of assignment fields. The controller can arrange this so-called management display system on his screen as well.

Figure 11:
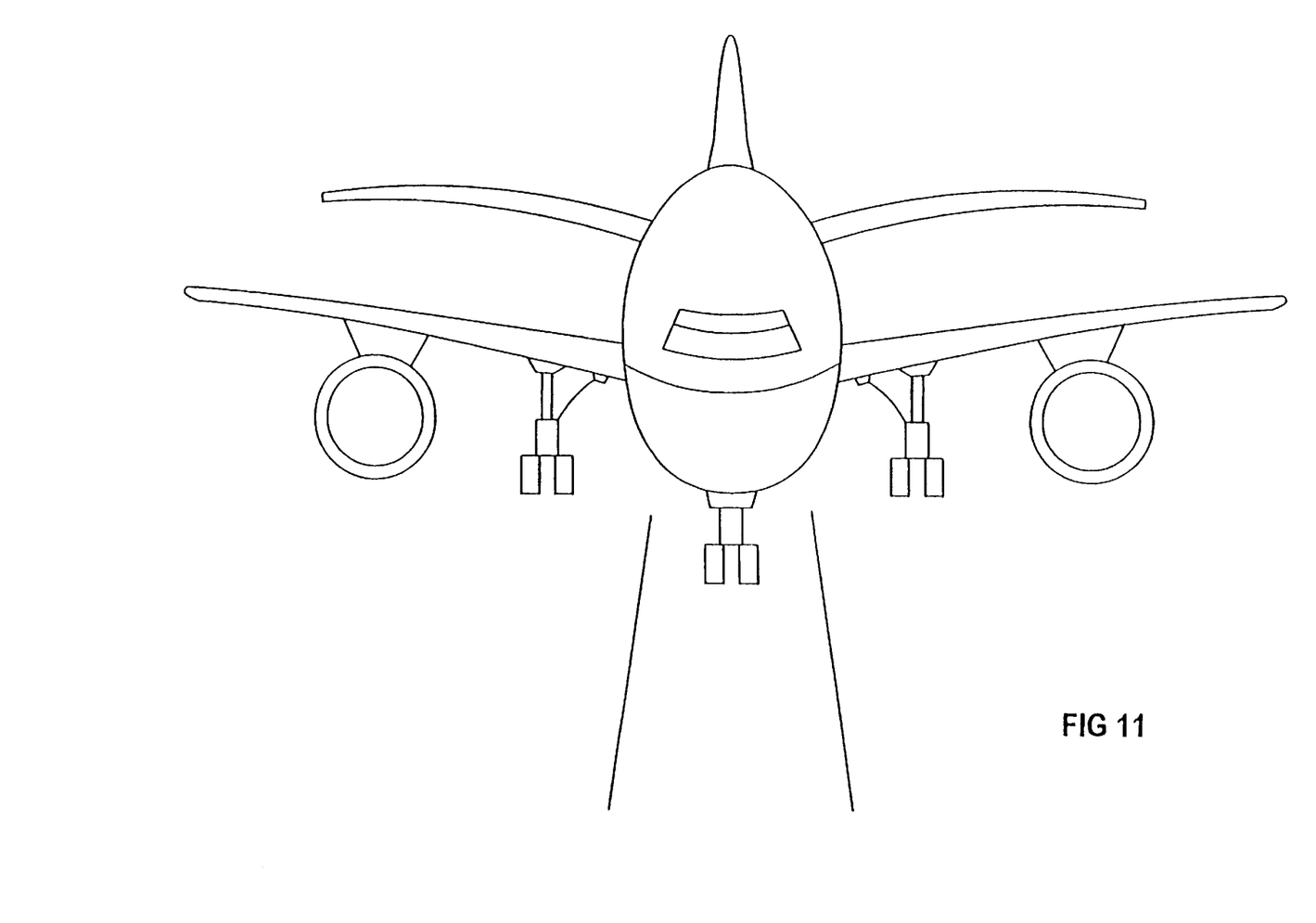
FIG. 11 is a schematic representation of a video sequence.

Finally, FIG. 11 shows an exemplary video sequence that the controller can position and arrange on his screen. Preferably he can also zoom and view details. He can also call up the video sequences of the corresponding gate that he wants to monitor for display on his monitor. Finally, he can intervene if necessary via the input units of the computer workstation, for example, by producing instructions on the signal display panel.

The exemplary embodiments shown are merely intended for explanation and are not to be construed as a limitation.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A method for automatically guiding an aircraft to a parking position in a parking zone, comprising:
   (a) detecting the aircraft by at least one video camera located in the parking zone and outputting video signals;
   (b) supplying the video signals from the at least one video camera to an evaluation unit;
   (c) determining the current position of the aircraft from the video signals in the evaluation unit;
   (d) determining correction instructions for direction of the aircraft from the video signals in the evaluation unit;
   (e) transmitting the correction instructions to the aircraft;
   (f) processing the video signals into video sequences in the evaluation unit;
   (g) identifying non-aircraft objects from the video signals in the evaluation unit; and
   (h) displaying the correction instructions and the video sequences on a control monitor together with additional monitoring data.

2. The method as claimed in claim 1, further comprising determining the aircraft type from the video signals in the evaluation unit.

3. The method as claimed in claim 1 wherein two video cameras with substantially identical detection areas detect the aircraft in said step (a).

4. The method as claimed in claim 1 wherein the video sequences are displayed as digital sequences on the control monitor.

5. The method as claimed in claim 4 wherein positioning of the display of the video sequences is adjustable on the control monitor.

6. The method as claimed in claim 4 wherein the display of the video sequences on the control monitor is adjustable with respect to size.

7. The method as claimed in claim 4 wherein the display of the video sequences is adjustable with respect to a zoom factor.

8. The method as claimed in claim 1 wherein different video sequences of different parking zones are displayed on the control monitor.

9. The method as claimed in claim 1 further comprising storing the video sequences in a storage location.

10. The method as claimed in claim 1 wherein video cameras located in different parking zones are linked to the evaluation unit.

11. The method as claimed in claim 1 wherein the correction instructions are optically transmitted to the aircraft.

12. The method as claimed in claim 1, further comprising detecting environmental parameters and supplying the parameters as further video signals to the evaluation unit.

13. A device for automatically guiding an aircraft to a parking position in a parking zone of an airport, comprising:

at least one video camera located in the parking zone to detect the aircraft and to output video signals;

at least one evaluation unit connected with the at least one video camera to determine correction instructions for direction of the aircraft and to provide video sequences from the video signals;

a signal transmission unit to transmit the correction instructions to a control of the aircraft; and a video sequence transmission unit to make the video sequences available for call-up by control personnel.

14. The device as claimed in claim 13 wherein the signal transmission unit comprises a signal display panel.

15. The device as claimed in claim 13, further comprising a second video camera arranged substantially parallel to said at least one video camera.

16. The device as claimed in claim 13 wherein the at least one evaluation unit comprises a computer.

17. The device as claimed in claim 13, further comprising a storage unit to store the video sequences.

18. The device as claimed in claim 13, further comprising an operator panel to manually operate the signal transmission unit.

19. Management system to operate an automatically supported guidance of aircraft to a parking position, comprising:

at least one video camera to detect the aircraft and to output video signals;

at least one evaluation unit connected with the at least one video camera to determine correction instructions for the aircraft and to provide video sequences from the video signals;

a signal transmission unit to transmit the correction instructions to the aircraft;

a video sequence transmission unit to make the video sequences available for call-up by control personnel; and a central control unit having a monitor to display the video sequences and monitoring data.

20. The method as claimed in claim 1, wherein, in step (d), correction instructions for speed of the aircraft are determined from the video signals in the evaluation unit.

21. The device as claimed in claim 13, wherein the evaluation unit is configured to determine correction instructions for speed of the aircraft.

* * * * *